350-171
6/9/81    XR    4,272,684    SR

United States Patent [19]
Seachman

[11]  4,272,684
[45]  Jun. 9, 1981

[54] OPTICAL BEAM-SPLITTING ARRANGEMENTS ON OBJECT SIDE OF A LENS

[75] Inventor: Ned J. Seachman, Penfield, N.Y.
[73] Assignee: Xerox Corporation, Stamford, Conn.
[21] Appl. No.: 949,179
[22] Filed: Oct. 6, 1978
[51] Int. Cl.³ .................... H01J 3/16; H04N 1/10
[52] U.S. Cl. ........................ 250/578; 250/216; 350/171; 358/212; 358/213; 358/225; 358/293
[58] Field of Search ............ 250/216, 578, 201, 204; 350/171, 137; 358/225, 293, 212, 213; 355/46, 51; 354/25

[56] References Cited
U.S. PATENT DOCUMENTS

| | | |
|---|---|---|
| 862,354 | 8/1907 | Stevens . |
| 2,403,733 | 7/1946 | Mainardi et al. . |
| 2,736,250 | 2/1956 | Papritz . |
| 3,039,358 | 6/1962 | Vierling ................ 350/137 |
| 4,005,285 | 1/1977 | Price ................ 250/578 X |
| 4,009,388 | 2/1977 | Seachman ............ 250/578 X |
| 4,044,384 | 8/1977 | Inokuchi ................ 358/293 |
| 4,059,757 | 11/1977 | Wilwerding .......... 250/201 |
| 4,141,625 | 2/1979 | Pickar et al. ............ 350/171 |

OTHER PUBLICATIONS

Janeway et al., "Multiple Diode Array Optics," IBM Technical Disclosure Bulletin, vol. 20 No. 1, Jun. 1977, pp. 18-19.

*Primary Examiner*—David C. Nelms
*Assistant Examiner*—Edward P. Westin

[57] ABSTRACT

An optical system for generating multiple linear images of an illuminated object line and focusing the image onto an image plane. The multiple images are generated on the object side of the lens using optical beam-splitting techniques. In a preferred embodiment, the images are converted into electrical signals after focusing onto photosensor arrays.

14 Claims, 7 Drawing Figures

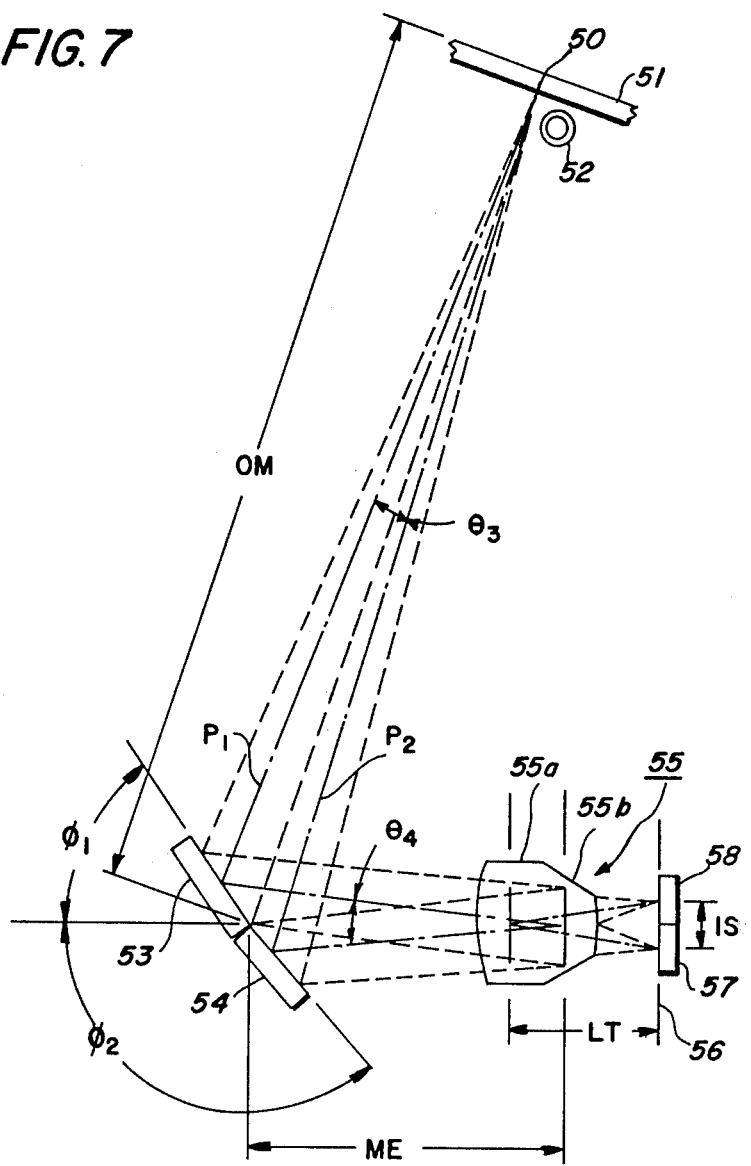

OPTICAL BEAM-SPLITTING ARRANGEMENTS ON OBJECT SIDE OF A LENS

BACKGROUND OF THE INVENTION AND PRIOR ART STATEMENT

This invention relates to an optical system which generates two or more identical images of an object line on the object side of a lens. The lens focuses the images or portions thereof, onto desired portions of an image plane. More preferably, the imaging plane comprises two or more linear photosensor arrays. The use of arrays of solid-state photosensors in applications such as video camera and facsimile transmission is known in the art. An object plane is scanned and the image of the scanned line is focused onto a photosensor array. The array comprises a plurality of photosensitive elements, such as photodiodes or metal-oxide-semiconductor (MOS) photodetectors arranged in a line. Each element produces an electrical signal representative of the irradiance of the portion of the image incident thereon so that the electrical signals, in combination, constitute an electrical representation of the scanned line. These signals can then be transmitted to remote locations and utilized as desired.

The semiconductor fabrication techniques currently employed have two characteristics which limit certain types of scanning applications. The maximum linear dimension of an array currently achievable with high production yields is approximately one inch; this array can be packed with an in-line array of 2000 photosensors. A single array, if produced at these outer limits is quite costly and is still not sufficient to provide sufficient resolution of scan lines which exceed more than 8½ inches in length. The optimum solution to this problem would be to butt together two or more arrays so that all the information along the line being scanned is sensed. However, this is not presently possible because even with the most efficient manufacturing techniques, there is a small space at the abutting interface resulting in some separation between the last element on one array and the first element on the next array. This space results in some unavoidable loss of information.

One solution to this problem is to optically abut the diodes. A typical system is disclosed in IBM Technical Disclosure Bulletin, Vol. 20, No. b 1, June 1977. As disclosed therein, a beam-splitter on the image side of a focusing lens produces a first and a second image. The arrays are located so that each array senses only a portion of the scanned line but they optically function as a single array. Price in U.S. Pat. No. 4,005,205 discloses a prism for splitting an optical path into twin paths on the image-side of a lens. These and other known methods of image-side beam-splitting however, are radiometrically inefficient. Between 50 and 75 percent radiometric losses can be experienced requiring compensation in the form of slower scan speed or greater scan illumination requirements. Further, when the full aperture of the lens is not used for each image, resolution degradation generally occurs.

U.S. Pat. No. 4,044,384 discloses several optical configurations wherein the scan line is divided into two or more portions and the images of each portion are focused onto respective photosensitive arrays or onto the same array sequentially. The signals are then combined electrically to reproduce the entire scan line. These configurations have the undesirable features of requiring additional lenses and, in the case of the single array, a shutter arrangement.

The present invention is directed to an optical system located on the object side of a lens which generates two or more linear images from the common object line being scanned. Since each image is, in effect, an original image, the significant radiometric losses of the image side beam-splitters discussed above is avoided. Since the full lens aperture is used for each image, resolution losses are also avoided.

It is known in the steroscopic art to form two separate stereoscopic negatives by using beam-splitters on the object side of the lens. See, for example, U.S. Pat. Nos. 2,403,733; 862,354; and 2,736,250. The particular requirements of these systems serve to distinguish them over the present optical system. For example, in order that the two separate images be perceived by the eye as a three-dimensional scene, the images that are produced must be slightly dissimilar. The present system requires identical images. The stereo systems disclosed require elaborate mirror/prism configurations to reduce the keystoning effect; the present system uses a simple two mirror system forming two principal ray paths with a small angular separation betweem them, as viewed from the line source being scanned. The present system uses a controlled zone of illumination at the object to prevent overlapping images. The stereo system is generally designed for broadly illuminated objects at large distances from the main lens and must therefore incorporate special field limiting stops on the mirror or prisms. Functionally, the present system in its preferred embodiment differs in that it is directed towards forming separate images of a scanned line and focusing the image onto photosensor arrays.

SUMMARY OF THE INVENTION

It is an object of this invention to provide an optical system which generates multiple images of an object line with maximum radiometric efficiency:

In a preferred embodiment, an object line is illuminated and multiple linear images of the line are generated by a first optical means which can be a pair of mirrors. At least a portion of each image is focused through a second optical means, which can be a focusing lens, onto an image plane. In a preferred embodiment, the image plane comprises physically separate photosensor arrays. The arrays are located so that each array senses a different portion of the scanned image, the net result being to image the entire illuminated line and electrically combine the sensed condition of each array to reconstitute the line.

BRIEF DESCRIPTION OF THE DRAWINGS

FIG. 7 is a schematic diagram of the preferred embodiment illustrating precise angular and linear measurements of the optical system.

DESCRIPTION OF THE PREFERRED EMBODIMENTS

Figure 1:
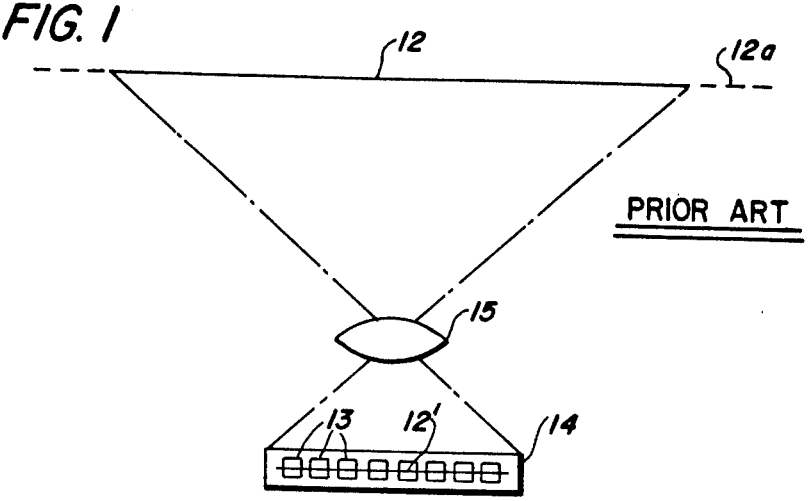
FIG. 1 is a diagram illustrating a prior art optical system imaging an object line onto a photosensor array.

To aid in understanding the present invention, FIG. 1 is useful to demonstrate the problems attendant on sensing information on scan lines of greater than typical document width of 8½". In FIG. 1, line 12 represents a narrow linear portion of a document (not shown) and constitutes a scan line to be sensed and converted into electrical signals by individually addressable photosensor elements 13 of array 14. Scan line 12 is illuminated by a light source (not shown) and a lens 15 focuses the image of line 12 onto elements 13. The focused image is represented by line 12'. If the length of array 14 is at the state of the art limit of 1 inch (25 mm) and if scan line 12 is at a typical length of 8½", lens 14 must reduce line 12 by a factor of 8½:1. Assuming further that array 13 is packed with the state-of-the-art limit of 2000 photosensor elements and a resolution of 240 elements/inch of scan is required, array 14 will provide satisfactory resolution. However, if the document width is increased to 11", scan line 12a must be scanned and a reduction of 11:1 by lens 15 is now required to image line 12a onto array 14. Adequate resolution requirements (at 240 elements/inch) are now increased to 2640 elements, beyond the single array capability. Image 12a will therefore not be detected by array 14 with the desired resolution.

Figure 2:
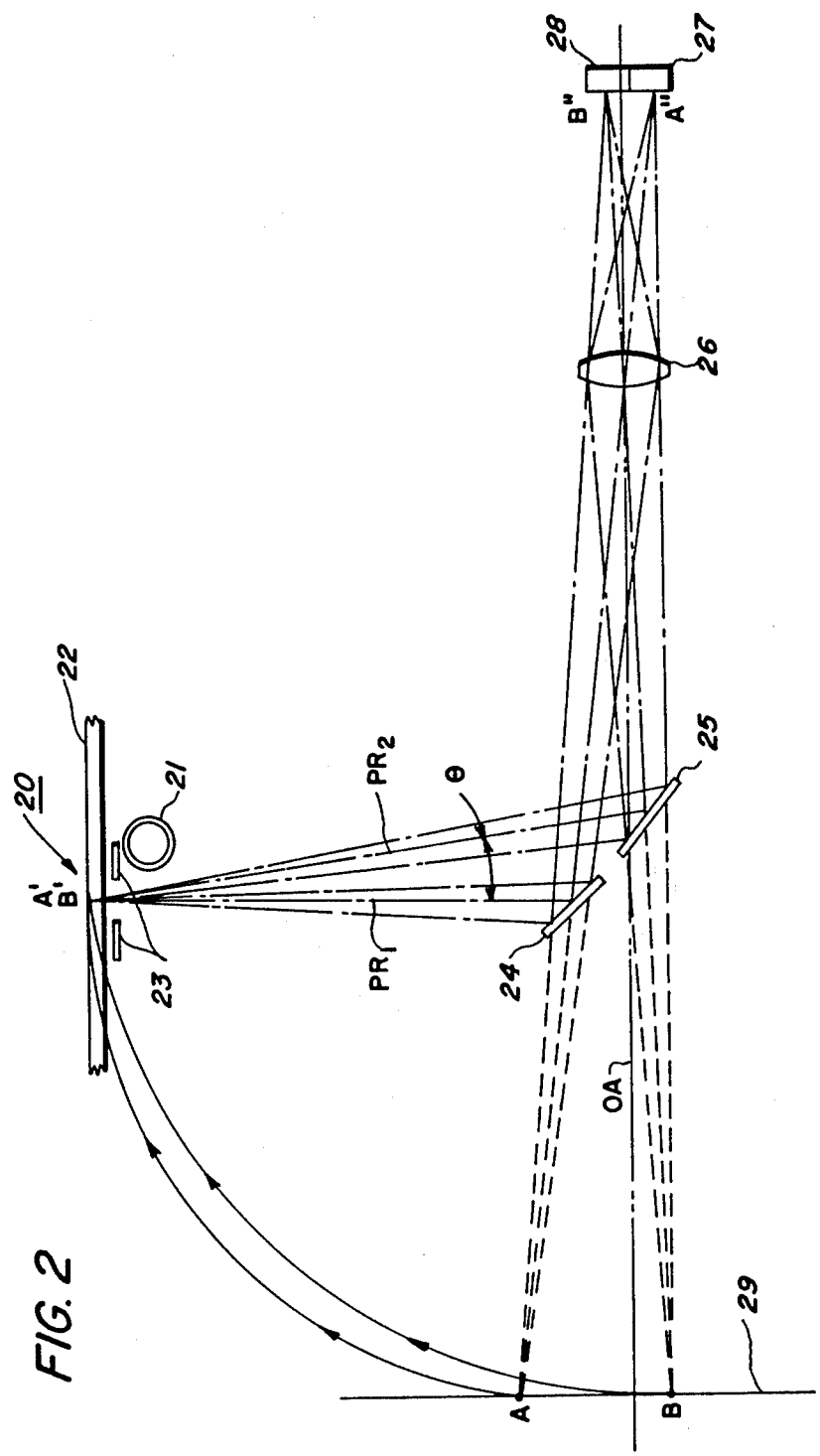
FIG. 2 is a schematic arrangement of a preferred embodiment of the optical system according to the present invention.

FIG. 2 illustrates a preferred embodiment of the present invention (not drawn to scale) which efficiently and economically avoids the aforementioned problems. Referring to FIG. 2, line 20 represents a line of information on a document (not shown) which is being illuminated by light source 21 through platen 22. It is appreciated that these elements are shown in end view and their lengths extend perpendicular to the plane of the page. Light source 21, which may include a reflector (not shown) provides a narrow pencil of intense light along the length of line 20 using techniques well known in the scanning art. Mirrors 24 and 25 are located beneath the platen and positioned relative to each other to reflect two principal rays PR1,PR2 into the entrance pupil of lens 26. Since each of the principal rays, and its associated bundle of light rays, originates from the same line 20, it should be appreciated that identical linear images are formed by the two mirrors in conjunction with the lens. Portions of these identical images of line 20 are focused onto the imaging plane occupied by arrays 27 and 28. If object line 20 is not illuminated by a relatively narrow strip of light, field stops 23 may be optionally inserted beneath platen 22, to prevent extreme portions of the image on array 27 overlapping into the detectors of array 28.

The constraints on the positions of mirrors 24 and 25 may be illustrated with reference to an apparent object plane 29, which is located perpendicular to the optical axis (line OA) of lens 26 at a distance from the first principal plane of the lens generally referred to as the object distance. In the absence of mirrors 24 and 25, two distinct lines, A and B, on this apparent object plane 29 would be imaged to A" and B" on photodetector arrays 27 and 28, respectively, by lens 26. Mirrors 24 and 25 are located along the principal rays from A and B to "Fold" separate object lines A and B to a new and coincident A', B', where the two object lines are caused to originate from a common object line 20. There are generally numerous positions at which the two mirrors 24 and 25 may be located and at which two distinct mirror orientations can be found to bring object lines A and B into coincidence. It is frequently desirable to locate mirrors 24 and 25 as close to lens 26 as possible and still permit the mirrors to have sufficient size to allow the ray bundles surrounding each principal ray to completely fill the entrance pupil of lens 26. This permits the lens to be used at its maximum aperture for best radiometric efficiency while maintaining a small included angle between principal rays PR1 and PR2 in the space between the platen and the folding mirrors. It is also generally preferred to select apparent object lines A and B symmetrically about the lens optical axis so that any residual symmetrical aberrations in lens 26 cause similar degradations to the two images of the real, common object line 20. It should be appreciated that additional parallel, object lines could have been chosen on the apparent object plane and folded to the common object line 20 by similar use of additional folding mirrors, producing three or more separated line images from the same object line 20.

Figure 3:
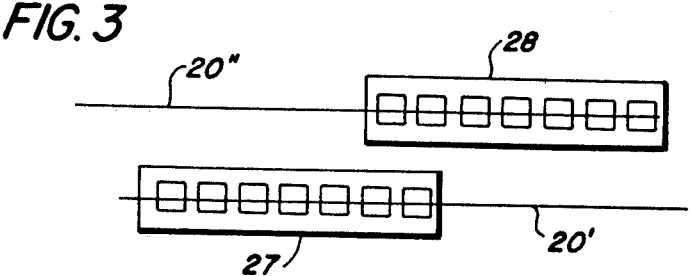
FIG. 3 is a plan view of the photosensors arrays shown in end view in FIG. 2.
Figure 4:
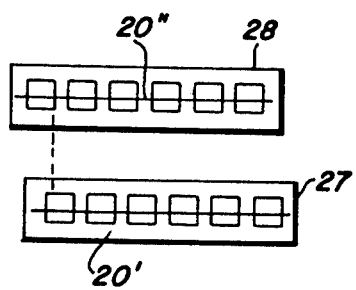
FIG. 4 is an alternate arrangement of the arrays shown in FIG. 3.

Referring now to FIGS. 3 and 4, FIG. 3 is a frontal view of arrays 27 and 28 showing one possible imaging arrangement. In this arrangement, each array is formed on a separate semiconductor chip and each senses slightly more than ½ the total length of the focused line image 20' and 20". Other divisions are, of course, possible. For example, more than two arrays may be positioned along the two image lines to divide the image into thirds, fourths, etc.

Each sensed portion of 20', 20" corresponds to a different portion of scan line 20 and when the electrical signals from both arrays are electrically summed with the appropriate phase relationship using appropriate circuitry (not shown) the entire scan line is recreated. In other words, arrays 27 and 28 function as though they were a single array.

It is appreciated that the number of photosensor elements depicted is only representative of the number that will be packed into the array. The precise number would be a function of the resolution required and the portion of the line image directed to the array.

In the FIG. 2 embodiment, the principal rays must be separated by an angle $\theta$ small enough to prevent significant object line separation (rangefinder effect) as small errors in object distance occur. For example, a curl in the document or platen misalignment could cause slight disparities between the two image plane lines. A preferable angular separation has been found to be less than 5°, however, this value is dependent on the lens f/# and the resolution desired. Higher angular separations are therefore possible. Mirror length, of course, is determined by the depth of the scan line.

FIG. 4 is a frontal view of a second configuration which arrays 27, 28 may assume. In this embodiment, the entire line image is sensed by each array. The photosensors of array 28 are mounted so as to be located midway between the centers of the photosensors of array 27. This array 27 is shifted along the same line of image information, relative to array 28, by one half of the center-to-center spacing of the photosensor elements. This technique is described in U.S. Pat. No. 4,009,388, assigned to the same assignee as the present invention, whose specification is hereby incorporated by reference.

Figure 5:
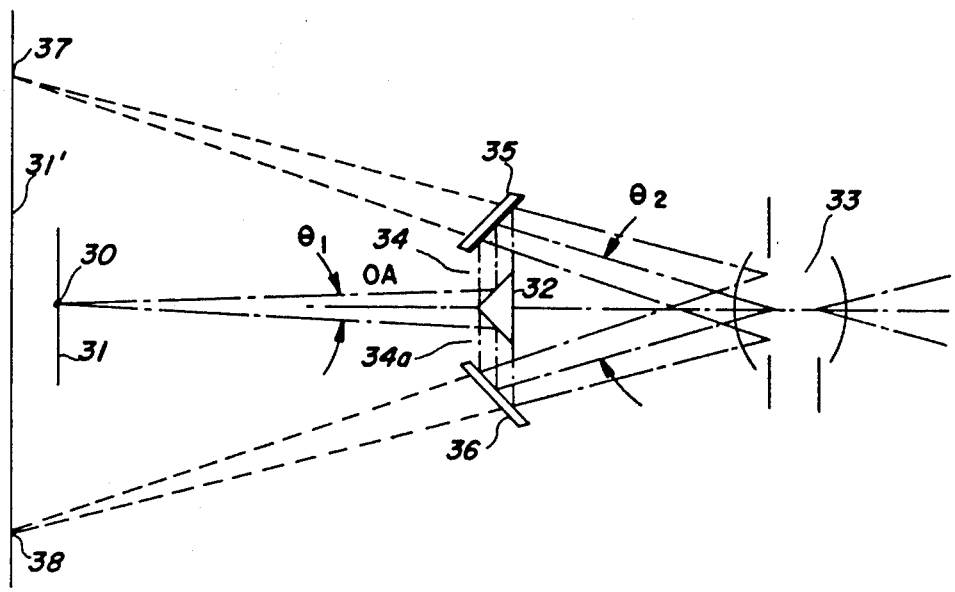
FIG. 5 is a schematic arrangement of a second embodiment of the invention utilizing a prism to increase angular separation of principal rays at the lens entrance pupil while minimizing the separation of these rays at the object line.

In some optical systems, space constraints may result in a shorter than desirable object-to-lens path resulting in insufficient mechanical separation of the linear images at the image plane thus resulting in inadequate space to accomodate multiple arrays. FIG. 5 illustrates an alternate optical system which amplifies the angle between principal rays to obtain sufficient separation of the two images. Principal rays directed from line 30 on object plane 31 and separated by angle $\theta_1$ are projected onto reflecting prism 32 disposed on the optical axis OA between lens 33 and the object plane. The prism has reflecting surfaces 34, 34a which serve to reflect the principal rays to adjacent mirrors 35,36. The mirrors each reflect an object line which apparently originates from points 37, 38 on an apparent object plane 31' behind real object plane 31. The rays reflected from the mirrors continue onto the lens but are now separated by a larger angle $\theta_2$. The lens focuses the two images onto photosensor arrays as previously described. It will thus be appreciated that $\theta_1$ is kept small to minimize the rangefinder effect but is increased following reflection to increase the separation of the apparent objects (and resulting images).

Figure 6:
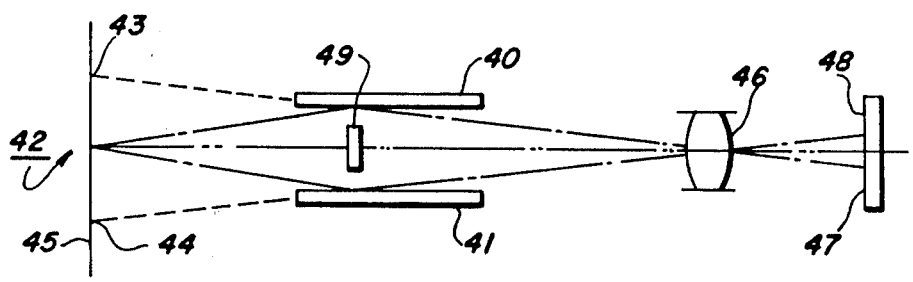
FIG. 6 is a schematic diagram of a third embodiment of the optical system of the invention.

A still further embodiment of the invention is shown in FIG. 6. Here mirrors 40, 41 are placed in a parallel or "tunnel" configuration. The mirrors reflect an image of line 42 which apparently originates from points 43, 44 respectively, lying on object plane 45. The mirrors must be larger, relative to the configurations of FIG. 2 or 5 to accomodate the rays to the full lens aperture. Lens 46 focuses the two images as previously described onto arrays 47, 48. It is noted that there is no inherent keystoning with this configuration; hence wider portions of the object may be accurately imaged onto the arrays; i.e. the object is not constrained to being along a very thin line. An interesting result of mirror placement is that a central (third) image will be formed at the image plane unless a blocking element 49 is positioned as shown. If desired however, the central image and either of the two mirrors can be used to produce the two desired identical images.

FIG. 7 illustrates an example of a specific optical system (not drawn to scale) constructed according to the invention. Object line 50, lying on platen 51 is illuminated by light source 52. The first angle $\theta_3$ between principal rays P1 and P2 is 1.9° while $\theta_4$ is 14.7°. Mirrors 53, 54 are arranged so that they define angles of $\phi_1$ (51.25°) and $\phi_2$ (136.5°) with respect to the optical axis. Lens 55 has a 65 mm focal length and is shown with a designated exit pupil 55a and entrance pupil 55b. The distance ME from mirror to entrance pupil is 2.7" (67.5 mm) and the distance LT from exit pupil to image plane 56 is 2.9" (72.5 mm). The distance OM from object line to mirror is 20.8" (520 mm). Arrays 57, 58 are arranged on the image plane. This configuration results in a 0.75" (18.75 mm) separation (IS) between two images.

The foregoing description of embodiments of this invention is given by way of illustration and not of limitation. For example, as suggested, more than two images may be formed in the image plane, thus requiring more than two mirrors. The number of arrays would be increased accordingly. Although the emphasis has been on a scanning system requiring scan dimensions in excess of 8½", the present invention is not to be limited to these scan situations. The techniques disclosed and claimed herein offer cost savings over expensive state of art single arrays even using 8½" documents. The invention may be useful practiced in conjunction with other types of imaging devices such as vidicons.

It is also apparent that the optical scanning system has been described in a static state; that is, without reference to any mechanical scanning movement. A practical system employing this invention would include some type of scanning system to effect relative movement between the object and the arrays. For example, the document may be moved along the platen in a direction orthogonal to the object line. In another approach, the entire assembly may be translated as a unit to cause the scanned object line to traverse the platen and document. Successive line images are thus formed at the photosensor arrays and successive combinations of electrical signals representing each line are collected and used as desired.

What is claimed is:

1. An optical system for focusing light reflected from an illuminated line on an object plane onto an image plane including
    an illumination means for illuminating said object line,
    at least two mirrors positioned with respect to said illuminated object line so as to simultaneously reflect identical images of said line into the entrance pupil of a lens, said lens focusing at least a portion of said reflected object line image onto a separate portion of said image plane.

2. An optical system as defined in claim 1 wherein an apparent object plane is located perpendicular to the optical axis of said lens and wherein said mirrors are arranged to fold apparently distinct, parallel object lines lying on said apparent object plane onto a common object line lying on the real object plane.

3. An optical system as defined in claim 2 wherein said apparent object lines are located symmetrically about said optical axis.

4. An optical system as defined in claim 1 wherein said image plane comprises at least two photosensor arrays, each array comprising a plurality of photosensitive elements which are individually addressable, said arrays providing electrical signals in response to said images focused thereon.

5. An optical system as defined in claims 2 or 3 wherein said mirrors produce an angular orientation between principal rays of the object line of less than 5°.

6. An optical system as defined in claim 1 further including a prism centered on the optical axis of the lens, two outer surfaces of said prism having reflective properties, such that principal rays propogating from said object line are reflected in a direction normal to said optical axis
    said mirrors being interposed in the path of said reflected principal rays, each mirror reflecting a separate image of said object line towards said lens said reflecting images having their apparent origin at lines in an apparent object plane.

7. An optical system for focusing light reflected from an illuminated line on an object plane onto an image plane including
    an illumination means for illuminating said object line,
    a lens having an optical axis perpendicular to said object plane so that a first central image of said object line is directly transmitted into the entrance pupil of said line, a mirror mounted in parallel with the lens optical axis so as to simultaneously reflect a second identical image of said object into the entrance pupil of said lens, said second image apparently originating from a line on the object plane distinct from the real object line.

8. An optical system as defined in claim 7 wherein said optical means further includes a second mirror mounted in opposing parallel relation with the first mirror, said mirror reflecting towards said lens an image of a second line on the object plane distinct from the real object line.

9. An optical system as defined in claim 8 wherein said optical means further includes a blocking element to prevent said central image from reaching the lens.

10. An optical scanning system for scanning an object plane, comprising
    illumination means for producing an intense narrow band of illumination at the object plane
    means for providing relative movement between the object plane and the illumination means so as to successively scan across the entire object plane
    at least two mirrors positioned with respect to said illuminated band so as to simultaneously reflect identical images of a scanned object line into the entrance pupil of a lens, said lens focusing at least a portion of said images onto an image plane.

11. An optical scanning system for converting images of object lines lying on an object plane into electrical signals comprising:
    an illumination means for illuminating the object line;
    at least two mirrors located with respect to said object plane so that separate principal rays from the same object line are reflected by the mirrors into the entrance pupil of a lens;
    at least two photosensor arrays, each array comprising a plurality of photosensitive elements which are individually addressable for providing electrical signals in response to sensed light impingement
    said lens focusing at least a portion of each of said multiple images onto a corresponding array.

12. An optical system as defined in claim 11 wherein each of said photosensors arrays is imaged by a portion only of each of said focused images and further including means for electrically combining the electrical output of each array to obtain reconstruction of the entire scanned line.

13. An optical system as defined in claim 11 wherein each of said photosensor arrays is simultaneously illuminated by an entire image each array sensing the entire line of said image and wherein the photosensors of one array are displaced along the image line by one-half the photosensor-to-photosensor distance relative to the other array.

14. The optical system as defined in claim 11 wherein said mirrors produce an angular orientation between principal rays of the object line of less than 5°.

* * * * *

REEXAMINATION CERTIFICATE (54th)

United States Patent [19]

Seachman

[11] B1 4,272,684

[45] Certificate Issued Mar. 1, 1983

[54] OPTICAL BEAM-SPLITTING ARRANGEMENTS ON OBJECT SIDE OF A LENS

[75] Inventor: Ned J. Seachman, Penfield, N.Y.

[73] Assignee: Xerox Corporation, Stamford, Conn.

Reexamination Request
   No. 90/000,147, Jan. 26, 1982

Reexamination Certificate for:
   Patent No.: 4,272,684
   Issued: Jun. 9, 1981
   Appl. No.: 949,179
   Filed: Oct. 6, 1978

[51] Int. Cl.³ .......................................... H01J 3/16
[52] U.S. Cl. ... 250/578; 250/216; 350/171; 358/212; 358/213; 358/225; 358/293
[58] Field of Search ... 250/216, 234, 235, 236, 250/578; 358/212, 213, 225, 293; 350/171

[56] References Cited

U.S. PATENT DOCUMENTS 4,272,684   6/1981   Seachman .................. 250/578

FOREIGN PATENT DOCUMENTS 697,039   10/1940   Fed. Rep. of Germany.
2010939   2/1970   France.
1395580   5/1975   United Kingdom.

*Primary Examiner*—David C. Nelms

[57] ABSTRACT

An optical system for generating multiple linear images of an illuminated object line and focusing the image onto an image plane. The multiple images are generated on the object side of the lens using optical beam-splitting techniques. In a preferred embodiment, the images are converted into electrical signals after focusing onto photosensor arrays.

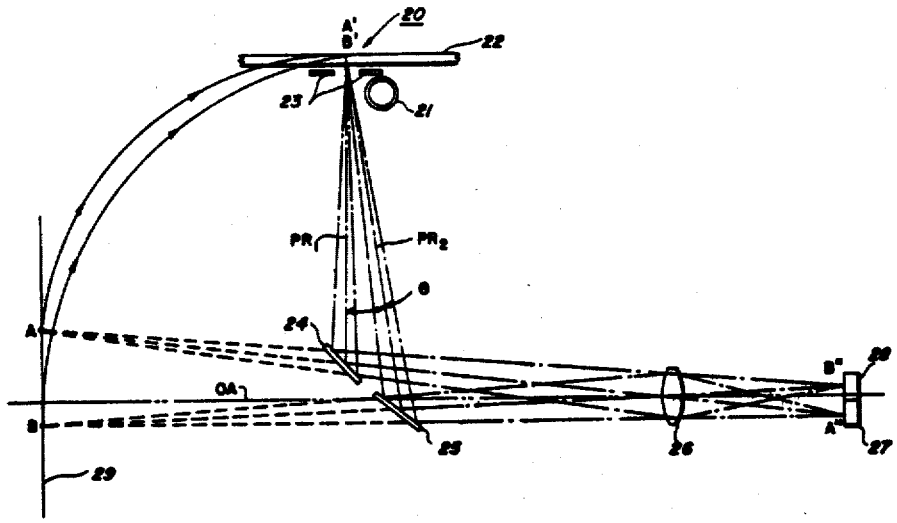

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3, 5, 9 and 10, having been finally determined to be unpatentable, are cancelled Claims 4, 6, 7 and 11 are determined to be patentable as amended:

4. An optical system [as defined in claim 1] *for focusing light reflected from an illuminated line on an object plane onto an image plane including*
   *an illuminated means for illuminating said object line,*
   *two mirrors positioned with respect to said illuminated object line so as to simultaneously reflect identical images of said line into the entrance pupil of a lens, said mirrors arranged to fold apparently distinct, parallel object lines lying on an apparent object plane located perpendicular to the optical axis of said lens onto a common object line lying on the real object plane, said lens focusing at least a portion of said reflected object line images onto a separate portion of said image plane* wherein said image plane comprises at least two photosensor arrays, each array comprising a plurality of photosensitive elements which are individually addressable, said arrays providing electrical signals in response to said images focused thereon.

6. An optical system [as defined in claim 1] *for focusing light reflected from an illuminated line on an object plane onto an image plane including*
   *an illumination means for illuminating said object line,*
   *two mirrors positioned with respect to said illuminated object line so as to simultaneously reflect identical images of said line into the entrance pupil of a lens, said mirrors arranged to fold apparently distinct, parallel object lines lying on an apparent object plane located perpendicular to the optical axis of said lens onto a common object line lying on the real object plane, said lens focusing at least a portion of said reflected object line images onto a separate portion of said image plane, said system further including a prism centered on the optical axis of the lens, two outer surfaces of said prism having reflective properties, such that principal rays* [propogating] *propagating from said object line are reflected in a direction normal to said optical axis*
   said mirrors being interposed in the path of said reflected principal rays, each mirror reflecting a separate image of said object line towards said lens said reflecting images having their apparent origin at lines in an apparent object plane.

7. An optical system for focusing light reflected from an illuminated line on an object plane onto an image plane including
   an illumination means for illuminating said object line,
   a lens having an optical axis perpendicular to said object plane so that a first central image of said object line is directly transmitted into the entrance pupil of said [line] *lens*,
   a mirror mounted in parallel with the lens optical axis so as to simultaneously reflect a second identical image of said object into the entrance pupil of said lens, said second image apparently originating from a line on the object plane distinct from the real object line.

11. An optical scanning system for converting images of object lines lying on an object plane into electrical signals comprising:
    an illumination means for illuminating the object line;
    [at least] two mirrors located with respect to said object plane so that separate principal rays from the same object line are reflected by the mirrors into the entrance pupil of a lens;
    at least two photosensor arrays, each array comprising a plurality of photosensitive elements which are individually addressable for providing electrical signals in response to sensed light impingement
    said lens focusing at least a portion of each of said multiple images onto corresponding array.

Claims 8 and 12-14, dependent on amended claims, are determined to be patentable.

* * * * *